United States Patent [19]

Hlavac et al.

[11] Patent Number: 4,599,915
[45] Date of Patent: Jul. 15, 1986

[54] ADJUSTABLE PEDAL

[75] Inventors: Harry F. Hlavac, 278 Tamalpais Ave., Mill Valley, Calif. 94941; Erik B. Koski, Larkspur, Calif.

[73] Assignee: Harry F. Hlavac, Mill Valley, Calif.

[21] Appl. No.: 568,596

[22] Filed: Jan. 6, 1984

[51] Int. Cl.⁴ ............................................. G05G 1/14
[52] U.S. Cl. ................................................. 74/594.4
[58] Field of Search ................ 74/594.4, 594.5, 594.6, 74/594.7, 560

[56] References Cited

U.S. PATENT DOCUMENTS 1,919,968  7/1933  Trabold ................................. 74/560

FOREIGN PATENT DOCUMENTS 95461  11/1896  Fed. Rep. of Germany ..... 74/594.4
10713  of 1885  United Kingdom ............... 74/594.4

Primary Examiner—Kenneth J. Dorner
Attorney, Agent, or Firm—Flehr, Hohbach, Test, Albritton & Herbert

[57] ABSTRACT

The present disclosure provides a pedal for use on any pedal powered vehicle or device, including bicycles and stationary bicycles, such as exercise bicycles, which is adjustable in one to three planes of movement. The adjustable pedal comprises a platform mounted on a shaft for supporting the foot, and one or more of the following: means for positioning the platform along a radial axis generally perpendicular to the axis of the shaft to provide a lifted position for the foot, means permitting the platform to tilt about the radial axis in a direction generally parallel to the shaft axis to provide inverted and everted positions for the foot, and means permitting the platform to pivot about the radial axis to provide toe-in and toe-out positions for the foot.

6 Claims, 3 Drawing Figures

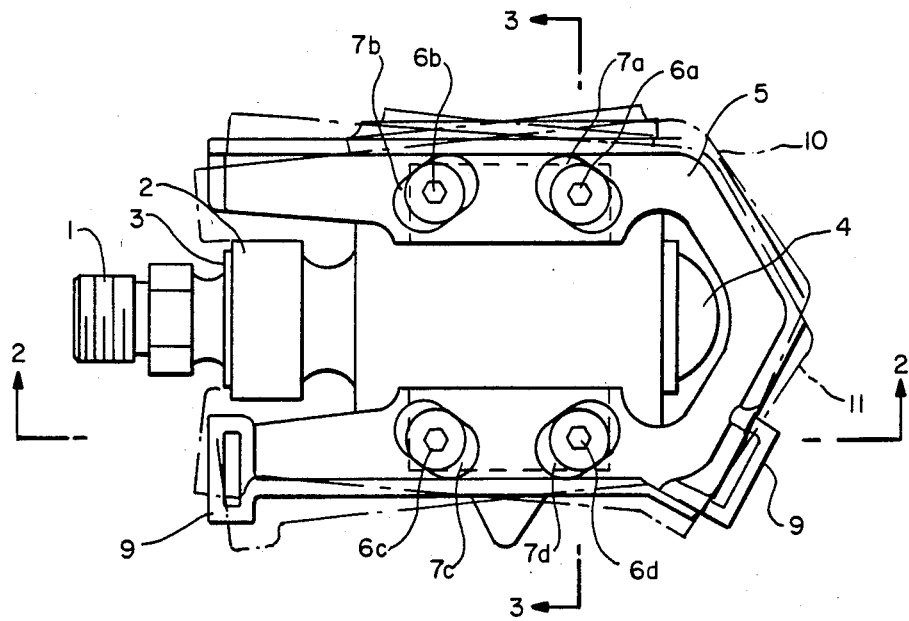
FIG.—1
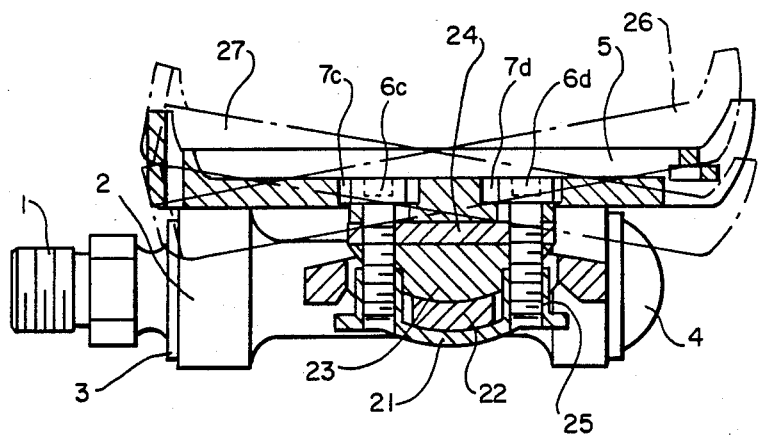
FIG.—2

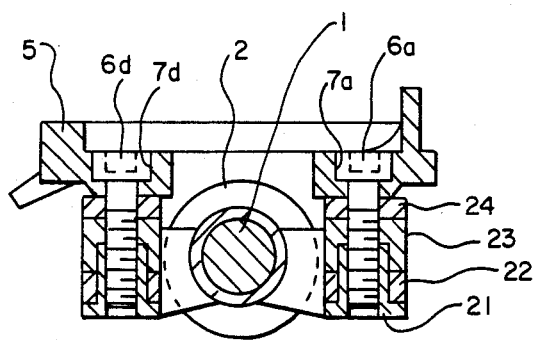
FIG.—3

ADJUSTABLE PEDAL

The present invention relates generally to an adjustable pedal for use on any pedal powered vehicle or device, including bicycles and stationary bicycles, such as exercise bicycles. Specifically, the present invention relates to a pedal which is adjustable in three planes of movement to adapt the plane of the foot to the plane of the pedal platform.

When a person has a limb length difference or a leg or foot imbalance such as bow legs, knock knees, inverted feet, everted feet, toed-in feet or toed-out feet, each time that person bears pressure on a conventional pedal, an abnormal force is applied causing inefficient movement. If these individual abnormal forces can be neutralized, a force perpendicular to the shaft of the pedal and in line with the direction of motion can be achieved, giving maximum efficiency of movement. This concept of perpendicular force has been applied in other sports with great success. Runners with leg length difference or leg or foot imbalance often use orthotic devices which support the foot inside of the shoe to correct the abnormal forces created by individual structural or functional imbalance. The orthotic device can be in the form of a lift, a wedge, an arch support, or other forms which adapt the surface of the foot to the ground and thus provide a perpendicular force in line with the direction of motion.

Competitive bicyclists frequently ride hundreds of miles per week and are subject to the same overuse problems that are seen in long-distance runners and other athletes involved in sustained aerobic repeated activities. Unlike a runner, whose foot contacts the ground and can be supported inside of the shoe, a bicyclist contacts the bicycle pedal directly under the ball of the foot. Only the ball of the foot needs support to correct imbalances and thus, the common use or orthoses is not practical. Also, due to the tight, stiff bicycle shoe worn by competitive bicyclists, an orthotic device does not fit inside of a bicycle shoe. Thus, for a bicyclist, the point of application of wedges or lifts should be at the pedal. Wedges and lifts, however, disturb the normal cleat mechanism on the bottom of the shoe and on the top of the pedal and are inappropriate for long-term use.

The most common source of pain in long-distance bicyclists is the anterior medial part of the knee. It appears that from the top of the bicycle stroke to the bottom, the knee often moves medially or laterally causing side-to-side forces on the foot and rotational forces on the leg with subsequent soft tissue strain. To achieve maximum efficiency of movement, side-to-side or rotational forces should be minimized or eliminated and replaced by a perpendicular force and direction of motion.

It is therefore an object of the present invention to neutralize any individual abnormal forces caused by structural or functional imbalance of the leg or foot and to achieve perpendicular forces resulting in maximum efficiency of movement during pedaling.

It is another object of the present invention to provide a pedal adjustable in three planes of movement.

In general, the adjustable pedal of the present invention comprises, a platform mounted on a shaft for supporting a foot and one or more of the following: means for positioning the platform along a radial axis generally perpendicular to the axis of the shaft to provide a lifted position for the foot, means permitting the platform to tilt about the radial axis to provide inverted and everted positions for the foot, and means permitting the platform to pivot about the radial axis to provide toe-in and toe-out positions for the foot. Preferably, the adjustable pedal has means for fixing the platform into the desired foot position.

FIG. 1 is a top plan view of one embodiment of the adjustable pedal.

FIG. 2 is a cross section view of the adjustable pedal taken along line 2 of FIG. 1.

FIG. 3 is a cross section view of the adjustable pedal taken along line 3 of FIG. 1.

Further objects and features of the invention will appear from the following description taken in conjunction with the accompanying drawings.

Referring to FIG. 1, a preferred embodiment of the adjustable pedal comprises a shaft 1 adapted to be connected to a crank arm (not shown) on a pedal powered vehicle. A hub assembly 2 is mounted on the shaft 1 and is sealed with dust seal 3 and dust cap 4. The pedal platform 5 is mounted on the hub assembly 2 by means of four identical bolts 6a, b, c and d passing through four slots 7a, b, c and d formed in the pedal platform. Preferably, the bolts are Allen bolts or Allen head cap screws. The pedal platform 5 has foot strap loops 9 to which a foot strap can be attached to hold a foot in position on the pedal platform 5.

Preferably, means permitting the pedal platform 5 to pivot about a radial axis generally perpendicular to the axis of the shaft 1, in what is known as the transverse plane, to a toe-in position or a toe-out position, comprises bolts 6 and slots 7. When the bolts 6 are loosened, the pedal platform 5 can be pivoted inwardly or outwardly by movement of the bolts 6 through the slots 7 to a toe-in position shown by phantom lines at 10 or to a toe-out position shown by phantom lines at 11. Preferably, the pedal platform 5 can be pivoted up to 5° in-toe from the radial axis and up to 5° out-toe from the radial axis or from the starting position of the pedal platform shown by solid lines at 5. However, a pivot of up to 10° or more can be provided. The pedal platform can be fixed at the 5° toe-in position or the 5° toe-out position or at any position between the two by tightening the bolts after the platform 5 has been moved to the desired position.

Referring to FIG. 2, the cross section view along line 2 of the adjustable pedal shown in FIG. 1, is shown. Preferably, means permitting the pedal platform 5 to tilt about a radial axis generally perpendicular to the axis of the shaft 1, in what is known as the frontal plane, comprises a curved seat 22 formed in the hub assembly 2, an arc 23 which pivots in the seat 22 and a curved clamp nut assembly which serves to hold the arc 23 in the seat 22 at the desired position. The bolts 6 pass through the arc 23, the seat 22 and are held in place by the clamp 21. When the bolts 6 are loosened, the arc 23 is free to pivot within the seat 22 causing the platform 5 to tilt to an everted position shown by phantom lines at 26 or an inverted position shown by phantom lines at 27. In the everted position, the inside border of the foot is tilted away from the midline of the body, a position known as valgus. In the inverted position, the foot is tilted toward the midline of the body, a position known as varus. Preferably, the pedal platform 5 can be inverted up to 10° and everted up to 10° from the starting position of the pedal platform shown by solid lines at 5. However, a larger degree of inversion and eversion can be provided. The arc 23 can be fixed in the 10° inverted position or the 10° everted position or at any position between the two by tightening the bolts 6 into the clamp nut assembly 21.

FIG. 2 shows a preferred means permitting the pedal platform 5 to tilt in the frontal plane, said means is located under the back of the pedal platform and the bolts 6c and d pass through it. An identical arrangement is located under the front of the pedal platform and the bolts 6a and b pass through it.

Preferred means for positioning the pedal platform 5 along a radial axis generally perpendicular to the axis of the shaft 1, in what is known as the sagittal plane, to provide a lifted position for the foot, also shown in FIG. 2, comprises bolts 6 and spacers 24. The bolts 6 are loosened and a spacer 24 of a chosen height is placed between the pedal platform 5 and the arc 23 to lift the platform 5 a given height from the hub assembly 2. Spacers of varying sizes are provided with the adjustable pedal so that a user can lift the pedal platform 5 to a given height, preferably, up to one inch from the starting position of the pedal platform 5. However, a lift of up to 3 inches or more can be provided. Each spacer 24 has two holes or a slot provided therein and the bolts 6 pass through the holes or the slot to secure the spacer 24 into position between the pedal platform 5 and the arc 23. The bolts 6 are tightened into the clamp nut assembly 21 to hold the spacer 24 tightly between the pedal platform 5 and the arc 23. One spacer 24 is held by bolts 6a and b (not shown) and one spacer 24 is held by bolts 6c and d.

Referring to FIG. 3, a cross section view of the adjustable pedal in FIG. 1 taken along line 3 is shown. FIG. 3 illustrates the passage of bolts 6a and d through the pedal platform 5, spacer 24, arcs 23, seats 22, and clamps 21.

Optionally, two bolts or even one bolt could be used to secure the platform in its adjusted position. In a two bolt embodiment, there would be a front bolt and a back bolt, each bolt singly clamping each arc 23 and spacer, if any, into the adjusted position. In a one bolt embodiment, a single arc, seat and clamp would be located under the center of the pedal platform and the arc would be clamped into the adjusted position by the single bolt. To obtain a lifted position, a single spacer would be used.

Optionally, adjustments in the frontal plane, as well as the sagittal plane, can be accomplished by means of spacers. For instance, if an everted tilt in the frontal plane is desired, a spacer can be inserted between the lateral end of the pedal platform 5 and the hub assembly 2 with bolts 6a and 6d passing therethrough. By raising the lateral end of the pedal platform 5, an eversion is achieved. Conversely, if an inverted tilt is desired, a spacer can be placed between the medial end of the pedal platform 5 and the hub assembly 2 with bolts 6b and 6c passing therethrough. Raising the medial end of the pedal platform 5 results in an inversion of the pedal platform. If a lift as well as an eversion or inversion is desired, two spacers would be used. For example, if an eversion and a lift is desired, a smaller spacer would be placed between the lateral end of the pedal platform 5 and the hub assembly 2 with bolts 6a and 6d passing therethrough and a larger spacer would be placed between the medial end of the pedal platform 5 and the hub assembly 2 with bolts 6b and 6c passing therethough. Lift is measured at the middle of a pedal platform.

The preferred embodiment of the adjustable pedal of the present invention shown in FIGS. 1, 2 and 3 includes means for adjusting the pedal in all three planes, i.e. the sagittal, transverse and frontal planes. Thus, the pedal can be adjusted in one, two or all three planes. For instance, the pedal platform can be everted, toe-in, and lifted (three planes) and then fixed in that position, or it can be inverted and lifted (two planes), or it can be everted (one plane). However, additional embodiments of the adjustable pedal include: a pedal adjustable in the transverse plane only, a pedal adjustable in the frontal plane only, a pedal adjustable in the transverse and frontal planes only, a pedal adjustable in the transverse and sagittal planes only, and a pedal adjustable in the frontal and sagittal planes only.

The adjustable pedal biomechanically balances the foot and leg on the pedal shaft of a pedal powered vehicle. A limb length difference can be corrected by adding a lift to the pedal upon which the shorter limb rests and leg imbalances such as bowlegs or knock-knees can be corrected by a combination of inversion or eversion and toe-in or toe-out adjustments. By the same token, foot imbalances such as inverted or everted feet or toed-in or toed-out feet can be corrected by the respective adjustment of inversion or eversion and toe-in or toe-out.

By adapting the plane of the foot to the plane of the pedal, individual structural or functional imbalances can be corrected thereby minimizing side-to-side or rotational forces resulting from those imbalances. Thus, a perpendicular force on the bicycle pedal can be achieved to maximize individual efficiency. Further, by compensating for the leg and foot imbalances, many overuse problems suffered by long-distance bicyclists can be prevented. By adjusting the bicycle pedal to the individual, abnormal forces can be neutralized thereby relieving any pain caused by such forces, including knee pain, ankle and foot pain, back pain, and other bone, joint and soft tissue pains.

With the adjustable pedal shown in FIGS. 1-3, an adjustment can be made in each of the three planes to compensate for a leg or foot imbalance and then fixed into position by tightening the bolts.

In another embodiment of the adjustable pedal, the pedal platform is mounted so that it moves freely in two planes, transverse and frontal plane.

Many modifications and variations of the present invention are readily obvious to those of ordinary skill in the art in light of the above specification and embodiments and it is understood that such modifications and variations are within the scope of the present invention.

What is claimed is:

1. An adjustable pedal, comprising:
   (a) a platform mounted on a shaft for supporting a foot;
   (b) means permitting said platform to pivot about a radial axis generally perpendicular to the axis of said shaft to provide toe-in and toe-out positions for the foot;
   (c) means permitting said platform to tilt about a radial axis generally perpendicular to said shaft axis to provide inverted and everted positions for the foot; and
   (d) means for fixing the pivot and tilt positions of said platform into different predetermined set foot positions as respects said shaft and as required for individual biomechanical balance.

2. An adjustable pedal, comprising:

(a) a platform mounted on a shaft for supporting a foot;
(b) means permitting said platform to pivot about a radial axis generally perpendicular to the axis of said shaft to provide toe-in and toe-out positions for the foot;
(c) means permitting said platform to tilt about a radial axis generally perpendicular to said shaft axis to provide inverted and everted positions for the foot;
(d) means for positioning said platform along a radial axis generally perpendicular to said shaft axis to provide a lifted position for the foot; and
(e) means for fixing the pivot, tilt and lift positions of said platfrom into different predetermined set foot positions as respects said shaft and as required for individual biomechanical balance.

3. An adjustable pedal according to claim 1 or 2 wherein said platform is mounted on a hub assembly and said hub assembly is mounted on said shaft.

4. An adjustable pedal according to claim 1 or 2 wherein said means for positioning said platform along the radial axis provides a lifted position for the foot of up to 1 inch from a starting position for said platform.

5. An adjustable pedal according to claim 1 or 2 wherein said means permitting said platform to tilt about the radial axis provides inverted foot positions of up to 10 degrees and everted foot positions up to 10 degrees from a starting position for said platform.

6. An adjustable pedal according to claim 1 or 2 wherein said means permitting said platform to pivot about the radial axis provides toe-in foot positions of up to 5 degrees and toe-out foot positions of up to 5 degrees from a starting position of said platform.

* * * * *